Patented Sept. 28, 1926.

1,601,507

UNITED STATES PATENT OFFICE.

GEORGE H. OSGOOD, OF TACOMA, WASHINGTON.

GLUE.

No Drawing. Application filed September 26, 1925. Serial No. 58,935.

The object of my invention is the production of a glue to be used in the manufacture of wooden articles, such as columns, doors and furniture, which is water resistant, of great strength, does not excessively wear the knives of the machinery working on the wood, and which is considerably cheaper than animal or casein glues of corresponding characteristics.

One of the major problems in the manufacture of wooden articles from glued stock, such as veneer construction, is the fact that when the rapidly moving knives of the machine pass over a glued joint the knives wear away very much faster at the point of contact with the glue than at any other point in their length and that therefore they have to be removed from the machine for regrinding much more often in order to maintain the desired uniformity of quality of work produced. This difficulty is successfully solved by my glue, which also has all the other desirable qualities of other glues.

My composition consists of a mixture of cotton-seed meal, commercial borax, caustic soda, permanganate of potash, hydrated lime, and copper sulphate, and the addition of calcium chloride and sodium silicate thereto, acts as a filler.

In preparing the glue for use the several ingredients are separately prepared and are mixed in the following order and proportions:

One hundred pounds of cotton-seed meal is first mixed in two-hundred to two-hundred-and-ninety pounds of water; then a solution composed of three pounds of commercial borax dissolved in six to nine pounds of water is mixed therewith; two pounds of caustic soda is dissolved in four to six pounds of water and mixed therewith; one and a half pounds of permanganate of potash is dissolved in three to five pounds of water and mixed therewith; fifteen pounds of hydrated lime is mixed with thirty to forty-five pounds of water and added to the mixture; and a solution of eight pounds of copper sulphate in sixteen to twenty-three pounds of water is mixed with the mass. The whole mass is thoroughly mixed and is then ready for use. It should have the consistency of a heavy liquid, such as molasses.

The quantity of water used in the preparation may be about two and three-quarter times the quantity of dry ingredients. The water aids in bringing the mixture into a homogeneous mass and controls its fluidity.

When a cheaper glue is desired a filler comprising a mixture of three pounds of calcium chloride and fifty pounds of sodium silicate dissolved in water may be added.

This preparation needs no warming or cooking to make it ready for use and can be applied at any time within twenty-four hours after the mixture has been prepared.

The cotton-seed meal used in this glue is the ordinary commercial article and contains a small amount of oil. The potassium permanganate is an oxidizing agent to act on the oils or fats to prevent their saponification when coming in contact with alkalies or caustics. The hydrated lime is used to assist in shortening the time that it takes the glue to set. The copper sulphate acts as a water-proofing agent. The sodium silicate is entirely a filler but exercises a certain amount of action on the protein, as is well known in the glue manufacturing trade. The calcium chloride is adapted to release the soda from the silicate and to prevent any further action of the sodium silicate after the glue has set.

I claim:—

1. A fluid composition adapted to form a water resistant, strong, non-abrasive glue comprising cotton seed meal, borax, caustic soda, permanganate of potash, hydrated lime and copper sulphate mixed in water.

2. A fluid composition adapted to form a water resistant, strong, non-abrasive glue comprising a mixture of about one hundred parts of cotton seed meal, three parts of commercial borax, two parts caustic soda, one and a half parts of permanganate of potash, fifteen parts of hydrated lime and eight parts of copper sulphate, each separately dissolved or mixed with water and separately mixed with the mass.

3. A fluid composition adapted to form a water resistant, strong, non-abrasive glue comprising cotton seed meal, borax, caustic soda, permanganate of potash, hydrated lime, copper sulphate, calcium chloride, and sodium silicate, mixed in water.

4. A fluid composition adapted to form a water resistant, strong, non-abrasive glue comprising a mixture of about one hundred parts of cotton seed meal, three parts of commercial borax, two parts of caustic soda, one and a half parts of permanganate of potash, fifteen parts of hydrated lime, eight parts of copper sulphate, three parts of calcium chloride, and fifty parts of sodium silicate, each separately dissolved or mixed with water and separately mixed with the mass.

GEORGE H. OSGOOD.